United States Patent
Vik et al.

(10) Patent No.: US 10,597,098 B2
(45) Date of Patent: Mar. 24, 2020

(54) SUSPENSION SYSTEM FOR A TRACK-DRIVEN WORK VEHICLE WITH RESILIENT ROLLER WHEEL BUSHINGS

(71) Applicant: CNH Industrial America, LLC, New Holland, PA (US)

(72) Inventors: Brian Vik, Barnesville, MN (US); Daniel Zurn, Horace, ND (US)

(73) Assignee: CNH Industrial America LLC, New Holland, PA (US)

(*) Notice: Subject to any disclaimer, the term of this patent is extended or adjusted under 35 U.S.C. 154(b) by 189 days.

(21) Appl. No.: 15/079,162

(22) Filed: Mar. 24, 2016

(65) Prior Publication Data
US 2017/0274946 A1 Sep. 28, 2017

(51) Int. Cl.
| B62D 55/14 | (2006.01) |
|---|---|
| B62D 55/15 | (2006.01) |
| B62D 55/08 | (2006.01) |
| B62D 55/108 | (2006.01) |
| B62D 55/065 | (2006.01) |

(52) U.S. Cl.
CPC ............ *B62D 55/15* (2013.01); *B62D 55/08* (2013.01); *B62D 55/1086* (2013.01); *B62D 55/065* (2013.01)

(58) Field of Classification Search
CPC ........ B62D 55/04; B62D 55/14; B62D 55/10; B62D 55/15; B62D 55/08; B62D 55/1086; B62D 55/065
See application file for complete search history.

(56) References Cited

U.S. PATENT DOCUMENTS

| 3,758,169 A | 9/1973 | Trapp | |
|---|---|---|---|
| 4,351,572 A * | 9/1982 | Fujiwara | B62D 55/1086 305/132 |
| 4,519,654 A | 5/1985 | Satzler et al. | |
| 4,647,116 A * | 3/1987 | Trask | B60K 17/02 305/132 |
| 5,293,948 A | 3/1994 | Crabb | |
| 5,456,331 A | 10/1995 | Gustin et al. | |
| 5,829,848 A | 11/1998 | Kelderman | |
| 5,873,640 A | 2/1999 | Oertley | |
| 5,899,542 A | 5/1999 | Lykken et al. | |
| 6,318,484 B2 | 11/2001 | Lykken et al. | |
| 6,435,292 B2 * | 8/2002 | Lemke | B62D 55/10 180/9.62 |

(Continued)

FOREIGN PATENT DOCUMENTS

| WO | WO 2014/022043 | 2/2014 | |
|---|---|---|---|
| WO | WO 2014022042 A1 * | 2/2014 | ........... B62D 55/104 |

*Primary Examiner* — Scott A Browne
(74) *Attorney, Agent, or Firm* — Rickard K. DeMille; Rebecca L. Henkel

(57) ABSTRACT

A roller suspension system for a track-driven work vehicle may generally include a support beam and a resilient bushing configured to be coupled to the support beam. The resilient bushing may define a shaft opening. In addition, the system may include a roller wheel assembly having a roller wheel and a roller shaft. The roller wheel may be rotatable relative to the roller shaft. In addition, the roller shaft may be received within the shaft opening of the resilient bushing such that the roller shaft is coupled to the support beam via the resilient bushing.

14 Claims, 8 Drawing Sheets

(56) References Cited

U.S. PATENT DOCUMENTS

| | | | |
|---|---|---|---|
| 6,607,256 B2 * | 8/2003 | Yoshida | B62D 55/08 |
| | | | 305/132 |
| 6,733,093 B2 | 5/2004 | Deland et al. | |
| 7,967,087 B2 | 6/2011 | Arulraja et al. | |
| 2001/0030068 A1 | 10/2001 | Nagorkea et al. | |
| 2010/0059297 A1 | 3/2010 | Urbanik et al. | |
| 2010/0237574 A1 * | 9/2010 | Allaire | B60G 5/02 |
| | | | 280/28.5 |
| 2011/0309672 A1 * | 12/2011 | Thorson | B62D 55/092 |
| | | | 305/138 |
| 2015/0217816 A1 * | 8/2015 | Franck | B62D 55/104 |
| | | | 305/142 |
| 2015/0321711 A1 * | 11/2015 | Vik | B62D 55/0842 |
| | | | 305/142 |
| 2016/0194038 A1 * | 7/2016 | Jean | B62D 55/084 |
| | | | 180/9.42 |

\* cited by examiner

SUSPENSION SYSTEM FOR A TRACK-DRIVEN WORK VEHICLE WITH RESILIENT ROLLER WHEEL BUSHINGS

FIELD OF THE INVENTION

The present subject matter relates generally to track-driven work vehicles and, more particularly, to a suspension system for a track-driven work vehicle including resilient bushings for coupling the roller wheels to a support beam of the system.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward.

Each track assembly is typically associated with a suspension system having an undercarriage support beam. The undercarriage support beam is used to support the vehicle above various load bearing wheels (e.g., roller wheels), which roll on the endless track as the work vehicle traverses a field or other driving surface. For most suspension systems, it is desirable to distribute the weight of the work vehicle across the load bearing wheels to reduce the stresses acting on the track that may otherwise decrease track longevity due to overheating or other weight overload issues. To allow for such weight distribution across the load bearing wheels, systems have been developed that are designed to dampen movement of one or more system components relative to the other components of the suspension system. For instance, U.S. Patent Publication No. 2015/0321711, entitled "Pin Assembly for a Tracked Work Vehicle Suspension System," and U.S. Patent Publication No. 2015/0217816, entitled "Suspension System for a Tracked Work Vehicle," both disclose suspension systems that allow a roller wheel beam of the system to be coupled to the undercarriage support beam in a manner that dampens movement of the wheel beam relative to the support beam. While such suspensions systems certainly provide improvements over other conventional suspension systems for track-driven work vehicles, further improvements and/or refinements are still needed to provide cost-effective suspension systems that allow for sufficient motion damping between the system components.

Accordingly, an improved suspension system for coupling the load bearing wheels to a support beam of the suspension system would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a roller suspension system for a track-driven work vehicle. The system may generally include a support beam and a resilient bushing configured to be coupled to the support beam. The resilient bushing may define a shaft opening. In addition, the system may include a roller wheel assembly having a roller wheel and a roller shaft. The roller wheel may be rotatable relative to the roller shaft. In addition, the roller shaft may be received within the shaft opening of the resilient bushing such that the roller shaft is coupled to the support beam via the resilient bushing.

In another aspect, the present subject matter is directed to a track assembly for a track-driven work vehicle. The track assembly may generally include a track, a drive wheel configured to engage the track and a roller wheel assembly including a roller wheel and a roller shaft. The roller wheel may be configured to rotate relative to the roller shaft when the track is being driven by the drive wheel. The track assembly may also include a suspension system coupled to the roller wheel assembly. The suspension system may include a support beam and a resilient bushing configured to be coupled to the support beam. The resilient bushing may define a shaft opening. The roller shaft may be received within the shaft opening of the resilient bushing such that the roller shaft is coupled to the support beam via the resilient bushing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
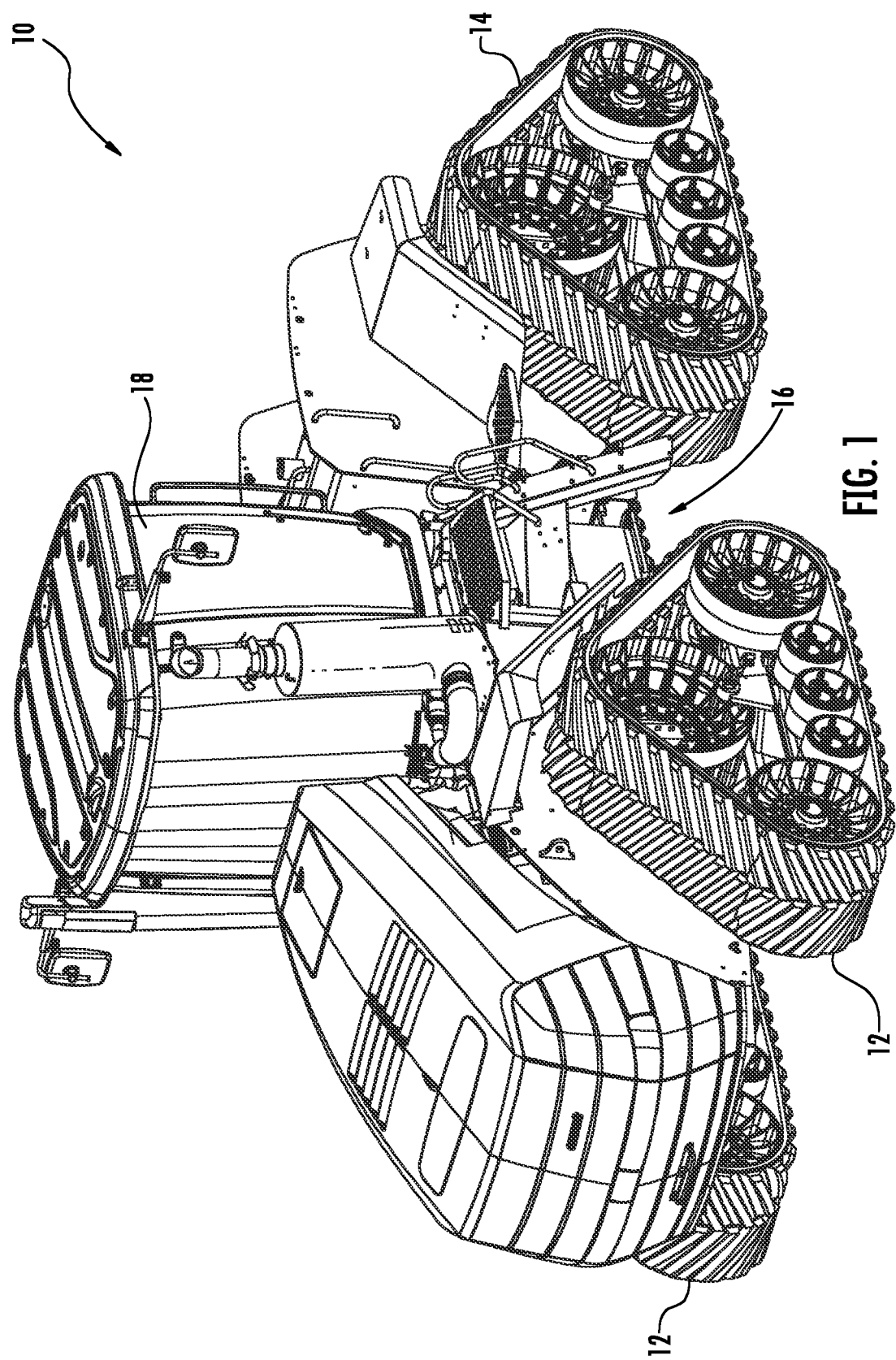
FIG. 1 illustrates a perspective view of one embodiment of a track-driven work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved suspension system for a track-driven work vehicle. Specifically, in several embodiments, the system may include resilient bushings configured to couple the roller shafts associated with the roller wheels of the vehicle's track assemblies to a support beam of the suspension system. For instance, in one embodiment, the roller shafts may be coupled directly to an undercarriage support beam of the suspension system via the resilient bushings. Alternatively, the roller shafts may be coupled to a separate roller support beam. In such an embodiment, the roller support beam may, in turn, be configured to be coupled to the undercarriage support beam (e.g., via one or more resilient mounting features).

It should be appreciated that the resilient bushings may be configured to deform or compress during operation of the work vehicle, thereby allowing the roller shaft/wheel to move relative to the undercarriage support beam and/or the roller support beam so as to provide damping within the system. Such damping may allow for desirable distribution of the weight of the work vehicle across the rollers wheels, which may, in turn, lead to a reduction in the stresses acting on the vehicle's tracks. Additionally, in several embodiments, the bushings may be shaped so as to provide roll conformance for an angled driving surface while still providing a given amount of vertical damping to the system. Moreover, the mounting configuration of the roller shafts to the undercarriage support beam or the roller support beam may be designed to limit the yaw movement of each shaft, thereby preventing contact between the roller wheels.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
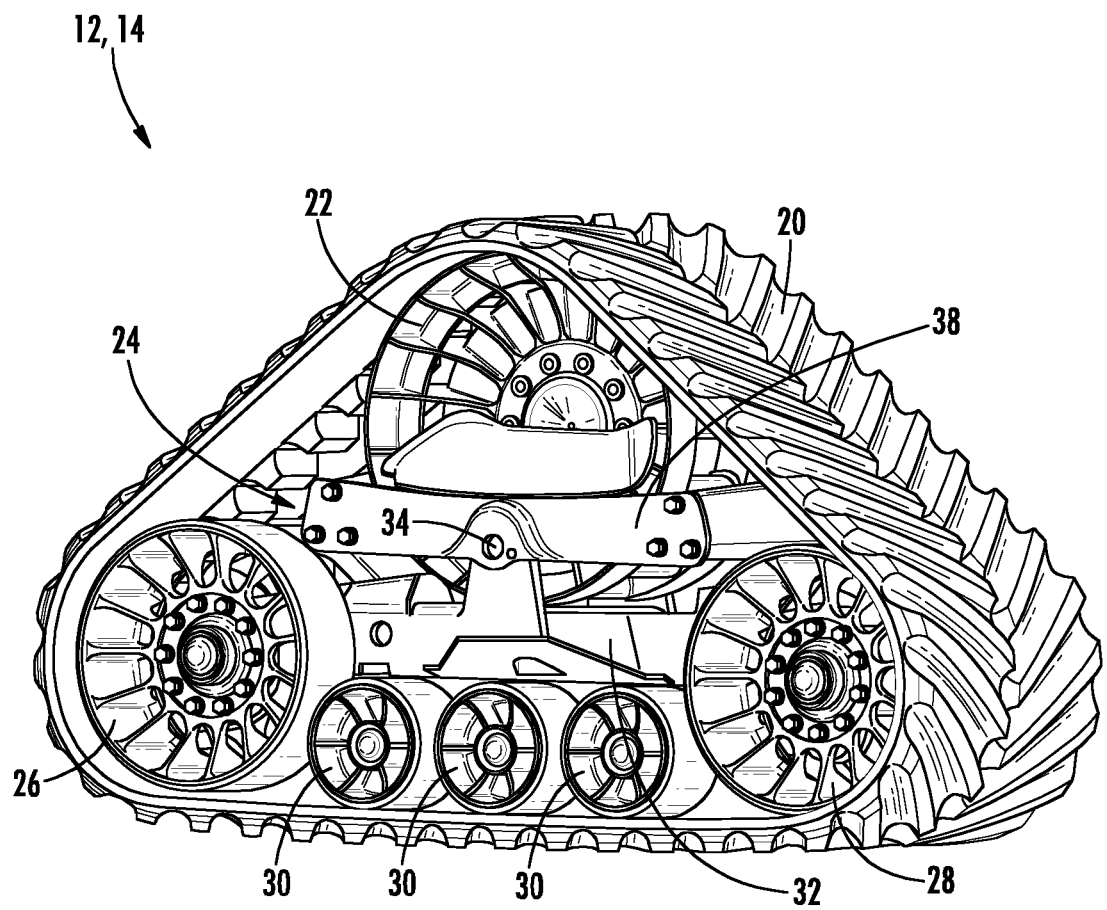
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and a suspension system 24 for supporting the weight of the work vehicle 10 and for damping vibrations and other movement between the track 20 and the vehicle's chassis 16. In one embodiment, the suspension system 24 may include front and rear idler wheel assemblies 26, 28 about which the track 20 is wrapped and a plurality of roller wheel assemblies 30 for guiding the track 20 between the idler wheels 26, 28. Additionally, the suspension system 24 may include an undercarriage support beam 32 configured to support the idler wheel assemblies 26, 28 and the roller wheel assemblies relative to the track 20. For example, as shown in FIG. 2, the undercarriage support beam 32 may extend fore-to-aft within the track assembly 12, 14 to allow the various wheel assemblies 26, 28, 30 to be coupled thereto.

As is generally understood, the undercarriage support beam 32 may be pivotally supported on the vehicle chassis 16 (FIG. 1) by two pivot pins, namely an outboard pivot pin 34 and an inboard pivot pin (not shown)). The outboard pivot pin 34 is located outboard of the drive wheel 22 while the inboard pivot pin is located inboard of the drive wheel 22 and is secured on the vehicle chassis 16. In general, the outboard pivot pin 34 may be configured to be coupled between an undercarriage bearing support member 38 and the undercarriage support beam 32. For example, the pivot pin 34 may be configured to be received within both an opening (not shown) defined through the bearing support member 38 and a corresponding outboard opening 35 (FIG. 9) defined in the support beam 32. The bearing support member 38 may, in turn, be secured at each of its ends to support posts (not shown) coupled to the vehicle chassis 16. As such, the outboard pivot pin 34 may serve to pivotally couple the undercarriage support beam 32 to the chassis 16.

It should be appreciated that a similar pivotal support arrangement may also be provided on the vehicle chassis 16 inboard of the drive wheel 22 utilizing the inboard pivot pin. For example, the inboard pivot pin may be configured to be received within a suitable opening 36 (FIG. 3) defined in the undercarriage support beam 32 for pivotally coupling the support beam 32 to the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Figure 3:
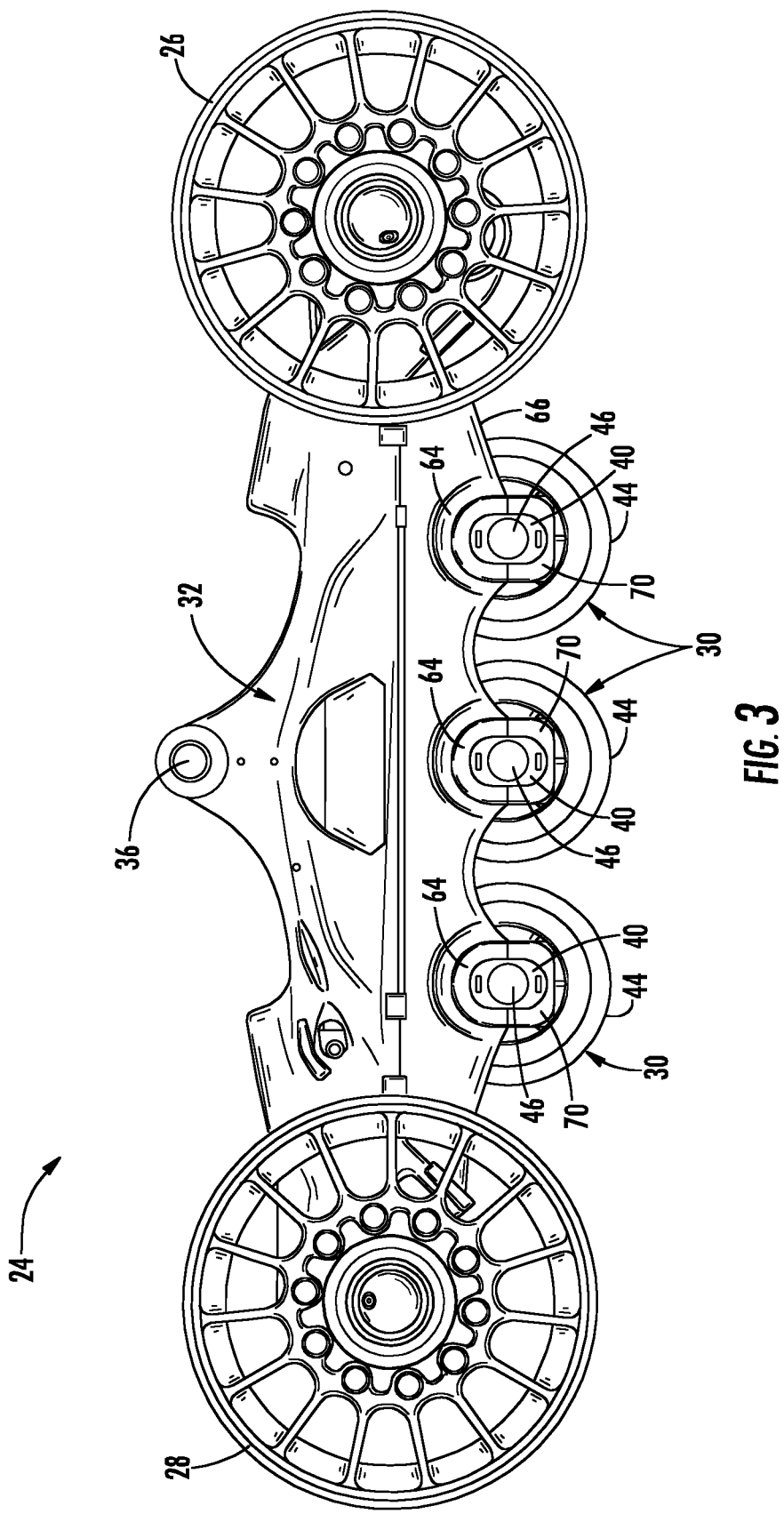
FIG. 3 illustrates a side view of one embodiment of various components that may be used in a suspension system for a track-driven work vehicle in accordance with aspects of the present subject matter, particularly illustrating an undercarriage support beam having roller wheel assemblies coupled thereto via resilient bushings and corresponding clamping members.
Figure 4:
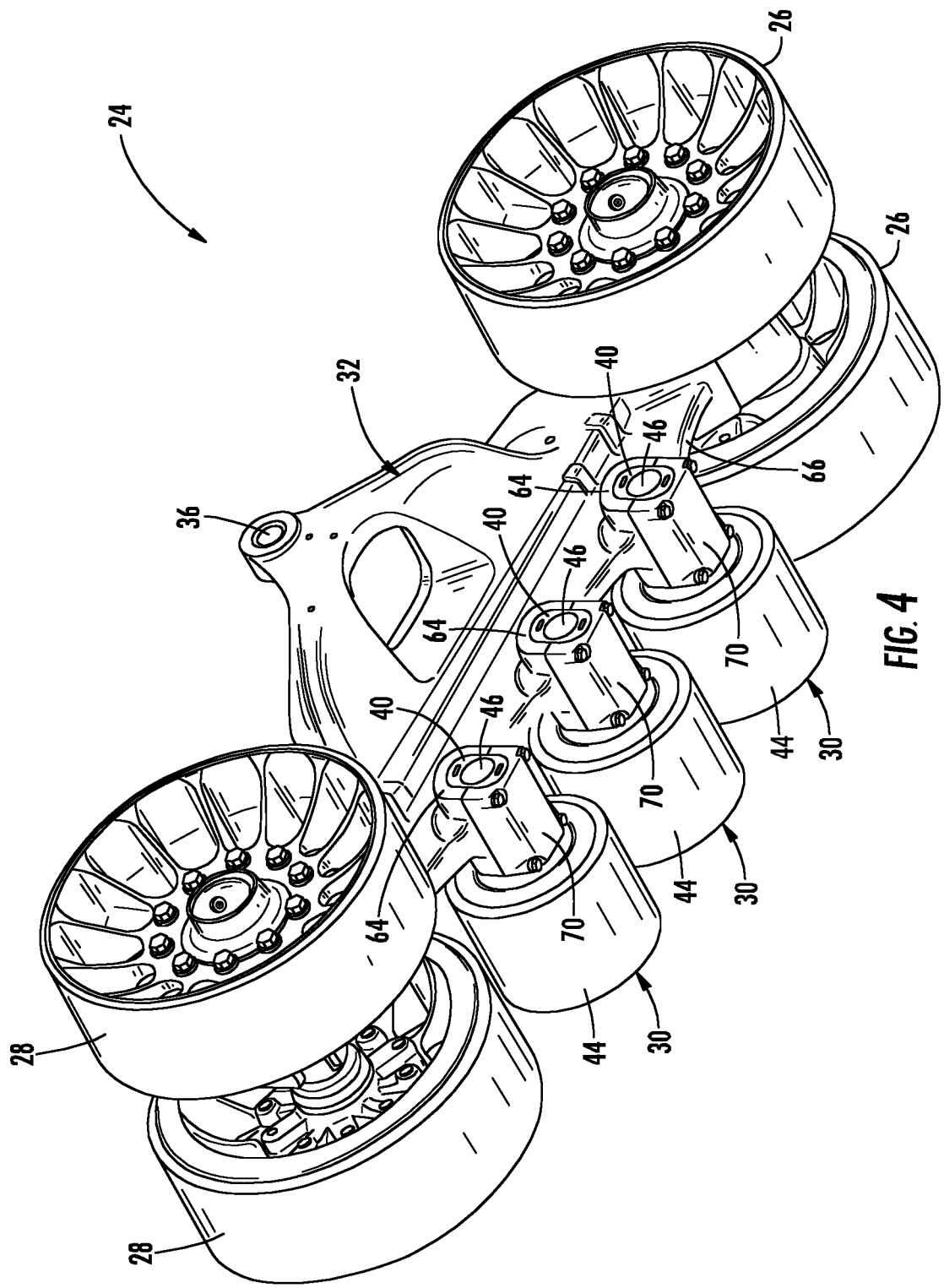
FIG. 4 illustrates a bottom perspective view of the system components shown in FIG. 3.
Figure 5:
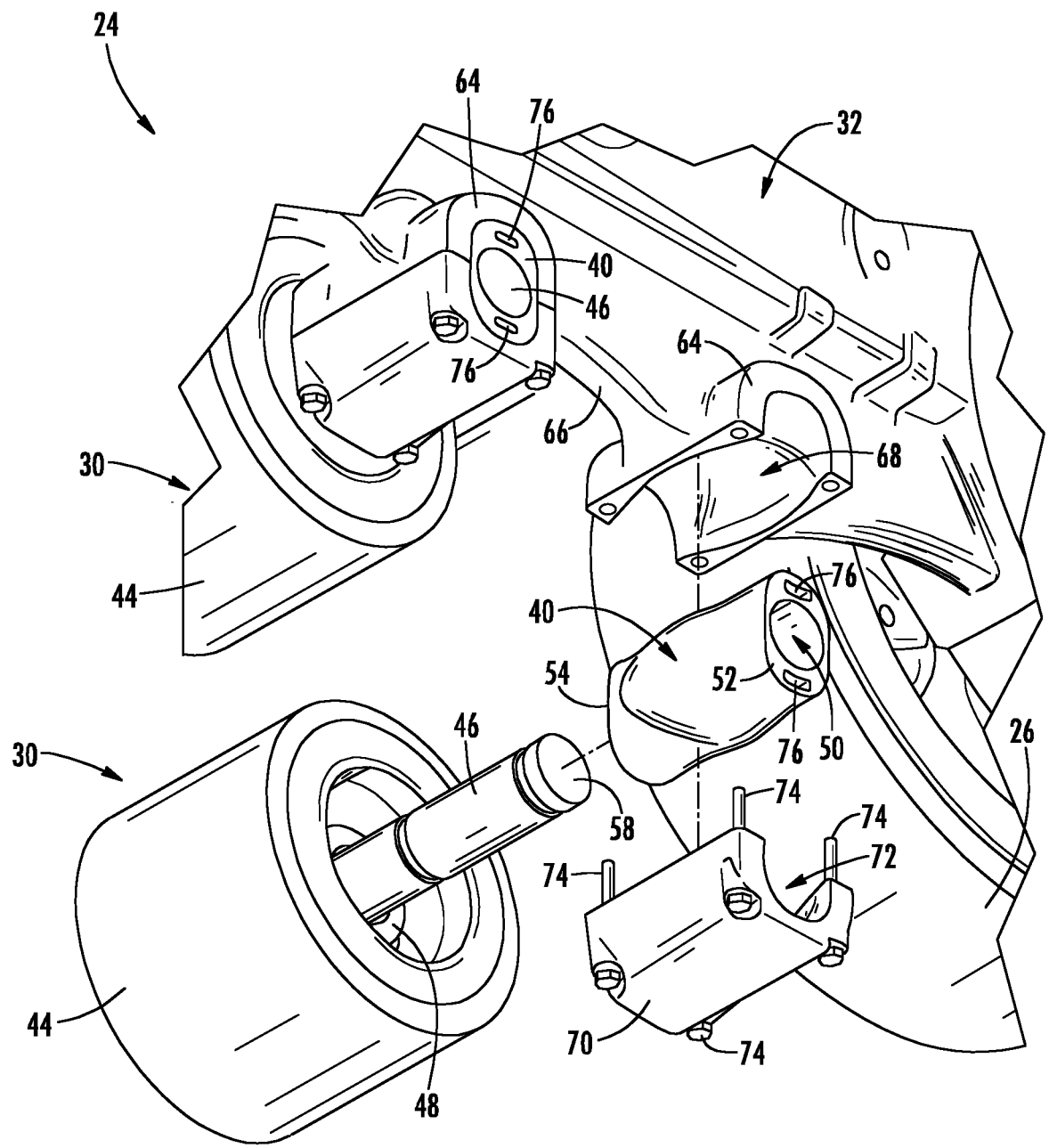
FIG. 5 illustrates a perspective view of a portion of the system components shown in FIG. 4, particularly illustrating one of the roller wheel assemblies and its corresponding bushing/clamping member exploded away from the undercarriage support beam.
Figure 6:
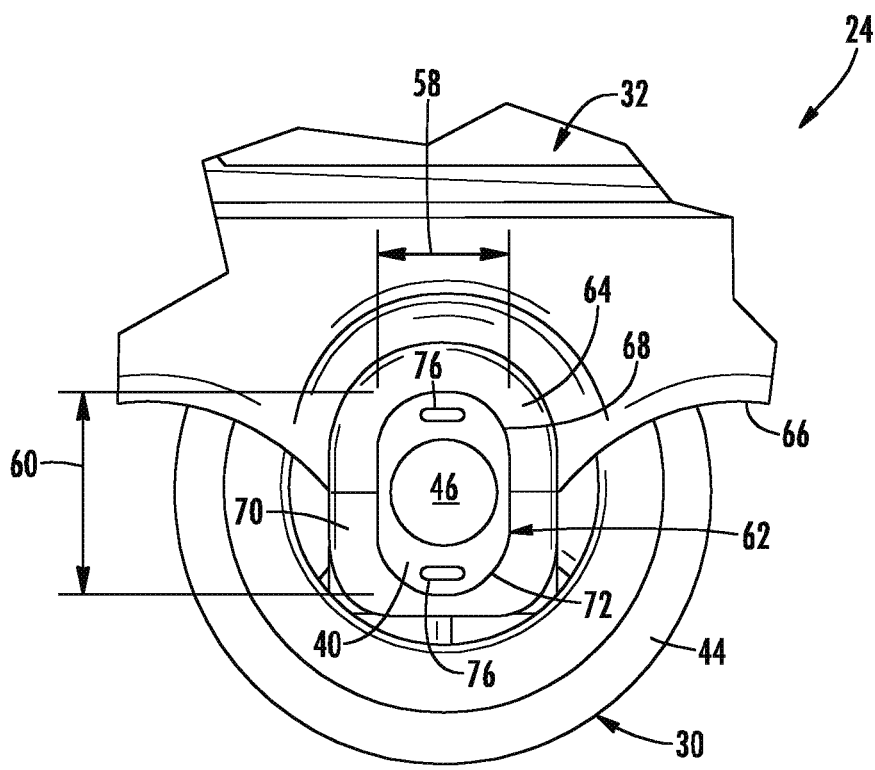
FIG. 6 illustrates a close-up side view of a portion of the system components shown in FIG. 3, particularly illustrating a side view of the resilient connection provided between roller wheel assembly and the undercarriage support beam.

Referring now to FIGS. 3-6, one embodiment of various components of the disclosed suspension system 24 that may be used to couple the roller wheel assemblies 30 to the undercarriage support beam 32 is illustrated in accordance with aspects of the present subject matter. Specifically, FIG. 3 illustrates a side view of the various system components, particularly illustrating the undercarriage support beam 32 having the idler wheel assemblies 26, 28 and the roller wheel assemblies 30 coupled thereto. FIG. 4 illustrates a bottom perspective view of the system components shown in FIG. 3, particularly illustrating each roller wheel assembly 30 being coupled to the undercarriage support beam 32 via a resilient bushing 40 and a corresponding clamping member 70. FIG. 5 illustrates a close-up view of a portion of the system components shown in FIG. 4, particularly illustrating one of the roller wheel assemblies 30 and the corresponding bushing/clamp 40, 70 being exploded away from the undercarriage support beam 32. Additionally, FIG. 6 illustrates a close-up, side view of the resilient connection defined between roller wheel assembly 30 and the undercarriage support beam 32.

As shown, each roller wheel assembly 30 may include a roller wheel 44 and a roller shaft 46 coupled to the roller wheel 44. In several embodiments, the roller shaft 46 may correspond to a fixed or non-rotating shaft. In such embodiments, the roller wheel 44 may be configured to rotate relative to the roller shaft 46 as the track 20 moves relative to the wheel 44 in a continuous loop during operation of the work vehicle 10. For instance, as particularly shown in FIG. 5, the roller wheel 44 may be coupled to the roller shaft 46 via a bearing 48 to allow the roller wheel 44 to rotate relative to the shaft 46.

Additionally, as particularly shown in FIGS. 3-6, the roller shaft 46 of each roller wheel assembly 30 may be configured to be coupled to the undercarriage support beam 32 via a resilient bushing 40. In general, each bushing 40 may be formed from a resilient material, such as a rubber material or other elastic material, that is configured to deform or compress between the roller shaft 46 and the undercarriage support beam 32 during operation of the work vehicle 10. Such deformation or compression of the bushing 40 may allow the roller shaft 46 and, thus, the roller wheel 44 to move relative to the undercarriage support beam 32. For example, the roller shafts 46 may be allowed to move both vertically and horizontally relative to the undercarriage support beam 32 to provide improved weight distribution as the vehicle 10 is being driven over uneven or angled driving surfaces, such as a crowned road.

As particularly shown in FIG. 5, each resilient bushing 40 may have a tube-like or hollow configuration defining a shaft opening 50 extending between a first end face 52 and a second end face 54 of the bushing 40. The shaft opening 50 of each bushing 40 may generally be configured to receive a free end 56 of one of the roller shafts 46. As such, when each roller shaft 46 is inserted through the shaft opening 50 of its corresponding resilient bushing 40, the bushing may envelop or encase a portion of the shaft 46 extending lengthwise between the first and second end faces 52, 54 of the bushing 40.

It should be appreciated that each bushing 40 may generally be configured to define any suitable shape and/or may have any suitable dimensions. For instance, in the illustrated embodiment, each bushing 40 defines an oval cross-sectional shape extending between its first and second end faces 52, 54. In such an embodiment, the bushings 40 may be configured to be oriented relative to the undercarriage support beam 32 such that the minor axis of the oval shape is oriented in the horizontal direction while the major axis of the oval shape is oriented in the vertical direction. For example, as shown in FIG. 6, the minor axis may define a width 58 of each bushing 40 extending in a horizontal direction whereas the major axis may define a height 60 of each bushing 40 extending in a vertical direction. Alternatively, the orientation of the major and minor axes may be reversed. Additionally, in further embodiments, each bushing 40 may be configured to define any other suitable shape, such as by defining a circular, triangular, rectangular, pentagonal or other suitable cross-sectional shape between its first and second end faces 52, 54.

Moreover, the bushings 40 may be configured to be coupled directly to the undercarriage support beam 32. Specifically, in several embodiments, each bushing 40 may be configured to be received within a bushing opening 62 (FIG. 6) defined at least partially by the undercarriage support beam 32. For instance, as shown in the illustrated embodiment, the undercarriage support beam 32 may include a plurality of mounting flanges 64 spaced apart along a bottom side 66 of the support beam 32, with each mounting flange 64 defining a beam recess or channel 68 (FIG. 5) configured to receive an upper portion of one of the bushings 40. In such an embodiment, the system 24 may also include a clamping member 70 configured to be coupled to the undercarriage support beam 32 at or adjacent to each mounting flange 64 to provide a means for clamping or retaining each bushing 40 against the support beam 32. For instance, as shown in FIG. 5, each clamping member 70 may define a clamp recess or channel 72 configured to receive a lower portion of one of the bushings 40. As such, when the clamping members 70 are coupled to the undercarriage support beam 32, the adjacent channels 68, 72 of the support beam 32 and each clamping member 70 may define a bushing opening 62 for receiving one of the bushings 40.

It should be appreciated that the channels 68, 72 defined in the undercarriage support beam 32 and the clamping members 70 may generally be configured so as to define a complementary shape to the overall shape of each bushing. For instance, in the illustrated embodiment, each bushing defines an oval-shaped cross-section between its first and second effaces 52, 54. In such an embodiment, each channel 68 defined in the support beam 32 and the corresponding channel 72 defined in each clamping member 70 may correspond to a U-shaped channel so as to generally conform to the shape of the upper and lower halves, respectively, of each bushing 40. It should also be appreciated that, in one embodiment, the channels 68, 72 may be slightly undersized relative to the size of the bushing 40. In such an embodiment, when the clamping members 70 are coupled to the undercarriage support beam 32, each bushing 40 may be slightly compressed within the corresponding bushing opening 62 defined between the undercarriage support beam 32 and the adjacent clamping member 70.

Additionally, it should be appreciated that the clamping members 70 may generally be configured to be coupled to the undercarriage support beam 32 using any suitable attachments means and/or method known in the art. For instance, as shown in the illustrated embodiment, the clamping members 70 are coupled to the undercarriage support beam using suitable mechanical fasteners 72, such as bolts. However, in other embodiments, the clamping members 70 may be coupled to the underage support beam 32 using any other suitable means, such as by welding each clamping member 70 to the support beam 32.

Moreover, as shown particularly shown in FIGS. 5 and 6, each bushing 40 may include one or more cutouts or secondary openings 76 defined between its first and second end faces 52, 54. For example, in the illustrated embodiment, each bushing 40 includes two secondary openings 76 spaced apart radially from the shaft opening 50 in the vertical direction. However, in other embodiments, each bushing 40 may include any other suitable number of secondary openings 76 defined at any other suitable location relative to the shaft opening 50. In general, the number, size, location, and shape of the secondary opening(s) 76 may be selected to achieve a desired resistance to compression in each direction. For example, to allow for more compression of the bushings 40, each bushing 40 may include a greater number of secondary openings 76 or may include a secondary opening(s) 76 with an increased size(s). Alternatively, each bushing 40 may include fewer secondary openings 76 and/or smaller secondary openings 76 to increase the resistance to compression of the bushing 40.

Figure 7:
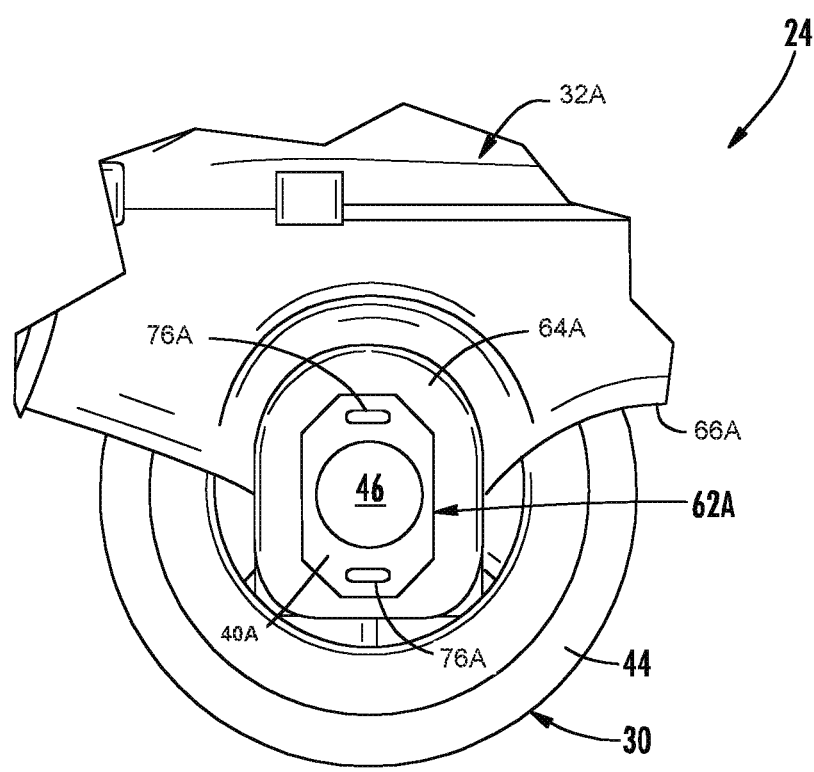
FIG. 7 illustrates a similar, side view of the system components shown in FIG. 6, particularly illustrating an alternative embodiment for coupling each resilient bushing to the undercarriage support beam and an alternative embodiments of a suitable shape for each resilient bushing.

It should be appreciated that, as an alternative to positioning each bushing 40 within a bushing opening 62 defined between the undercarriage support beam 32 and each adjacent clamping member 70, bushings 40A may, instead, be configured to be received within bushing openings 62A defined entirely by the undercarriage support beam 32A. For example, FIG. 7 illustrates an alternative embodiment in which bushing openings 62A are defined through the undercarriage support beam 32A at a location adjacent to its bottom side 66A for receiving the bushings 40A. In such an embodiment, each bushing 40A may be configured to be pressed or otherwise inserted into its corresponding bushing opening 62A defined by the support beam 32A.

In addition, FIG. 7 also illustrates an alternative embodiment for the cross-sectional shape of the bushings 40A. Specifically, as shown in FIG. 7, the bushing 40A defines an octagonal shape and include secondary openings 76A. In such an embodiment, as opposed to the oval shaped bushing opening 62 described above, the undercarriage support beam 32A, including mounting flange 64A, (or a combination of the beam 32 and the clamping member 70 for the embodiment described above with reference to FIGS. 3-6) may be configured to define a complementary octagonal-shaped opening 62A having straight edges or sides to accommodate the non-curved faces of the bushing 40A.

Figure 8:
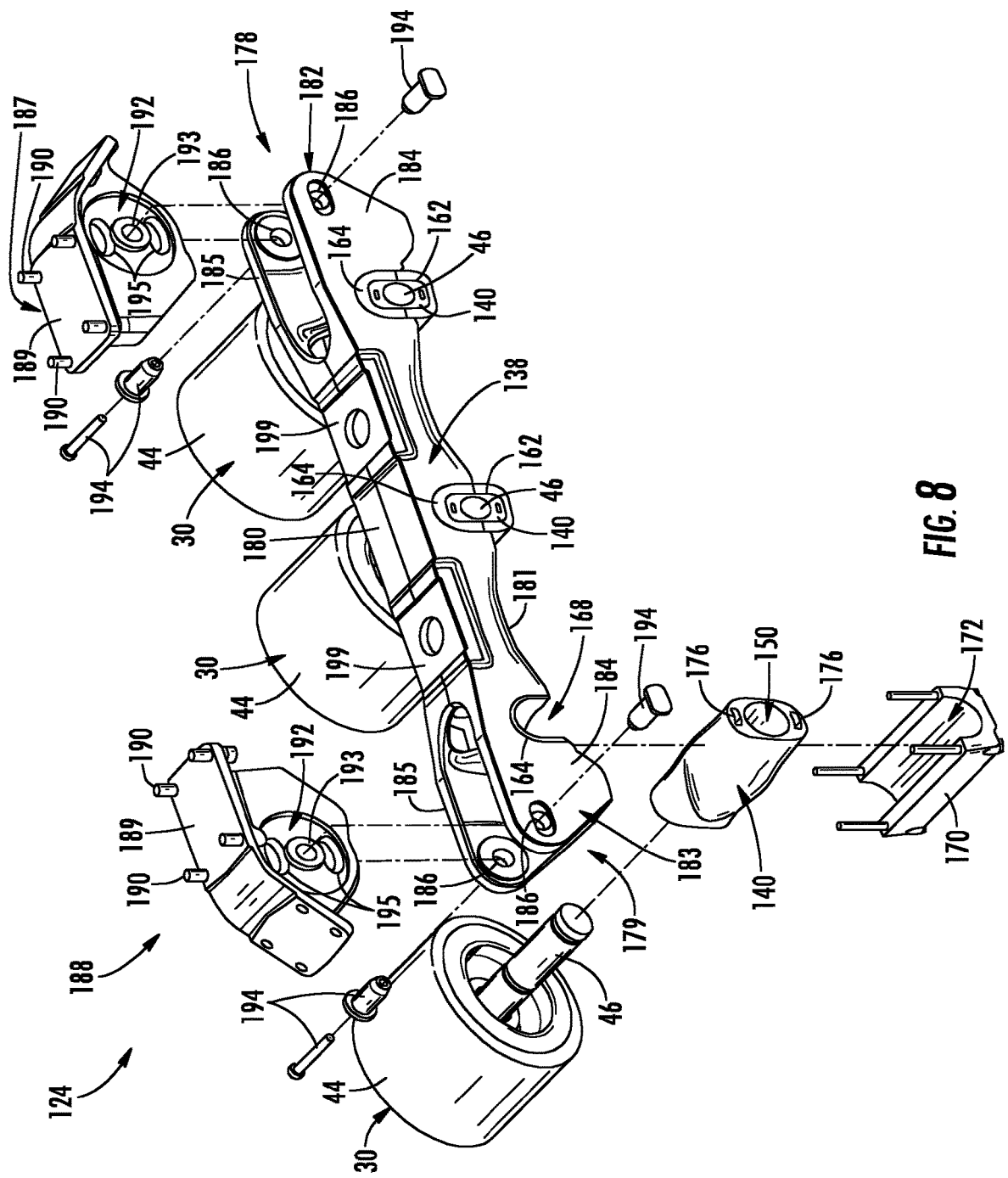
FIG. 8 illustrates a perspective, exploded view of another embodiment of various components that may be used in a suspension system for a track-driven work vehicle in accordance with aspects of the present subject matter, particularly illustrating a roller support beam to which the roller wheel assemblies are configured to be coupled via resilient bushings and corresponding clamping members.
Figure 9:
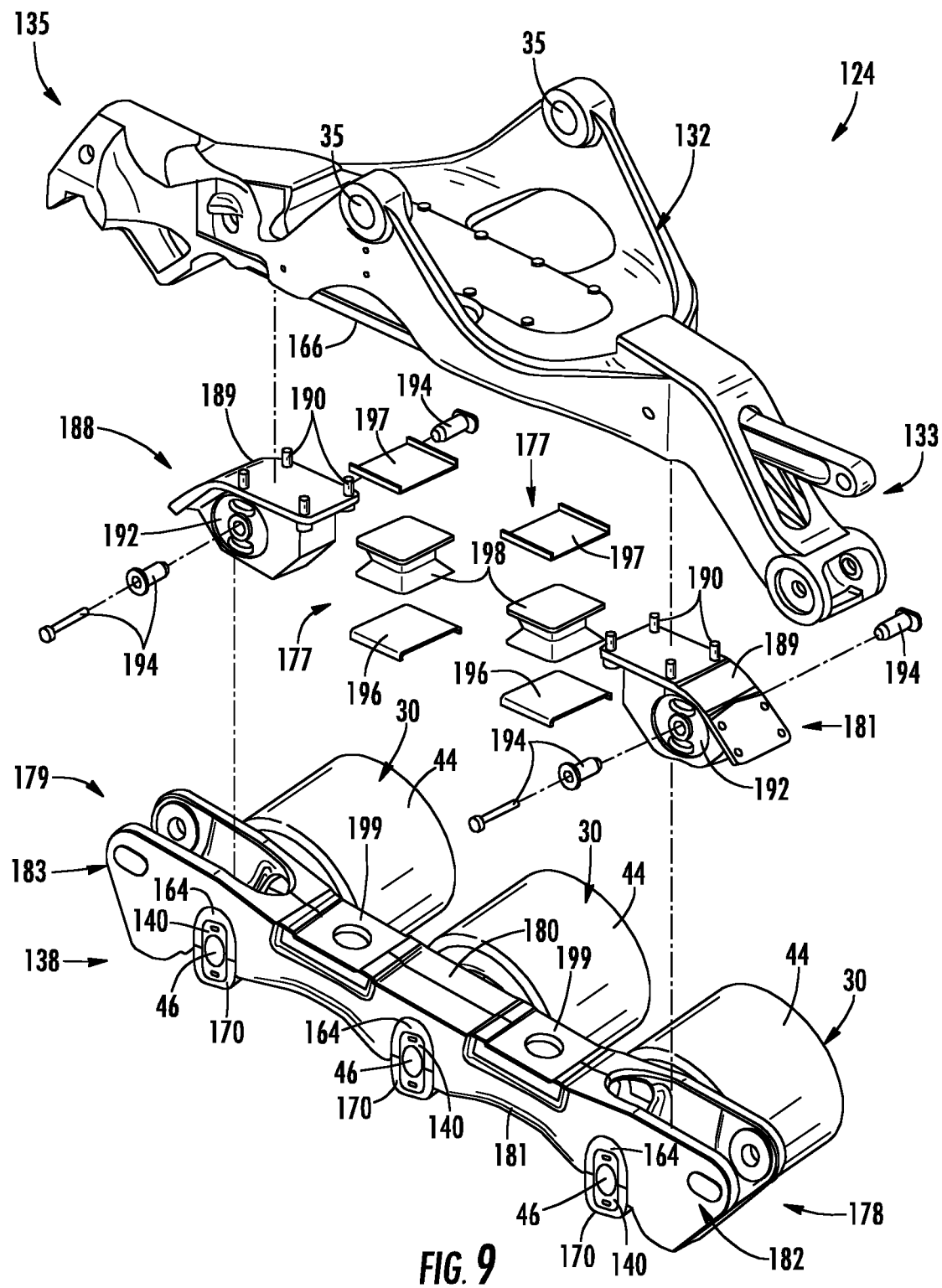
FIG. 9 illustrates a perspective, exploded view of additional system components that may be utilized in combination with the roller support beam shown in FIG. 8, particularly illustrating exemplary bushing mounts and vertical mounts for coupling the roller support beam to an undercarriage support beam of the suspension system.

Additionally, it should be appreciated that, as an alternative to coupling the roller wheel assemblies 30 directly to the undercarriage support beam 32 via the bushings 40, the roller wheel assemblies 30 may, instead, be coupled to a separate support beam that is, in turn, configured to be coupled to the undercarriage support beam 32. For instance, FIGS. 8 and 9 illustrate an alternative embodiment of a suspension system 124 including a separate roller support beam 138 to which the roller wheel assemblies 30 are configured to be attached. Specifically, FIG. 8 illustrates a perspective view of the roller support beam 138 with one of the roller wheel assemblies 30 exploded away from the support beam 138, particularly illustrating suitable resilient bushings 140 and clamping members 170 that may be used to couple the roller wheel assemblies 30 to the roller support beam 138. Additionally, FIG. 9 illustrates an exploded view of various system components that may be used to couple the roller support beam 138 to a corresponding undercarriage support beam 132 of the system 124.

As particularly shown in FIG. 8, the roller support beam 138 may generally have a beam-like configuration extending lengthwise between a forward end 178 and an aft end 179 and heightwise between a top side 180 and a bottom side 181. In several embodiments, the roller support beam 138 may include a front clevis 182 disposed at its forward end 178 and a rear clevis 183 disposed at its aft end 179. Each clevis 182, 183 may include a first arm 184 and a second arm 185 spaced apart from the first arm 184. In addition, each clevis 182, 183 may include a pair of aligned openings 186 defines through its clevis arms 184, 185. As will be described below, front and rear bushing mounts 187, 188 may be configured to be coupled to the front and rear devises 182, 183, respectively, to allow the roller support beam 138 to be coupled to the undercarriage support beam 32.

Additionally, as shown in FIG. 8, the roller shaft 46 of each roller wheel assembly 30 may be configured to be coupled to the roller support beam 138 via a resilient bushing 140. In general, each bushing 140 may be configured the same as or similar to the bushings 40 described above with reference to FIGS. 3-7. For instance, each bushing 140 may be formed from a resilient material, such as a rubber material or other elastic material, that is configured to deform or compress between the roller shaft 46 and the roller support beam 138 during operation of the work vehicle 10, thereby allowing the roller shaft 46 and, thus, the roller wheel 44 move relative to the roller support beam 138. Additionally, each bushing 140 may have a tube-like or hollow configuration defining a shaft opening 150 for receiving a portion of one of the roller shafts 46. Moreover, each bushing 140 may also include one or more cutouts or secondary openings 176 to allow the compressibility of the bushing 140 to be tailored or adjusted, as desired.

As shown in FIG. 8, the bushings 140 may be configured to be coupled directly to the roller support beam 138. Specifically, similar to the embodiment described above with reference to the undercarriage support beam 132, each bushing 140 may be configured to be received within a bushing opening 162 defined at least partially by the roller support beam 138. For instance, as shown in the illustrated embodiment, the roller support beam 138 may include a plurality of mounting flanges 164 spaced apart along the bottom side 182 of the support beam 138 between the forward and aft devises 182, 183, with each mounting flange 164 defining a beam recess or channel 168 configured to receive an upper portion of one of the bushings 140. In such an embodiment, the system 124 may also include a clamping member 170 configured to be coupled to the roller support beam 138 at or adjacent to each mounting flange 164 to provide a means for clamping or retaining each bushing 140 against the support beam 138. For instance, as shown in FIG. 8, each clamping member 170 may define a clamp recess or channel 172 configured to receive a lower portion of one of the bushings 140. As such, when the clamping members 170 are coupled to the roller support beam 138 (e.g., via mechanical fasteners), the adjacent channels 168, 172 of the support beam 138 and each clamping member 170 may define a bushing opening 162 for receiving one of the bushings 140.

It should be appreciated that, similar to the embodiment described above, the channels 168, 172 defined in the roller support beam 138 and the clamping members 170 may generally be configured to define shapes that match or correspond to the shape of each bushing 140. For instance, in the illustrated embodiment, each bushing 140 defines an oval cross-sectional shape. In such an embodiment, each channel 168 defined in the support beam 138 and the corresponding channel 172 defined in each clamping member 170 may correspond to a U-shaped channel that generally matches the shape of the upper and lower halves, respectively, of each bushing 140. It should also be appreciated that, in one embodiment, the channels 168. 172 may be slightly undersized relative to the size of the bushing 140. In such an embodiment, when the clamping members 170 are coupled to the roller support beam 138, each bushing 140 may be slightly compressed between the roller support beam 138 and the adjacent clamping member 170.

Additionally, it should be appreciated that, as an alternative to positioning each bushing 140 within a bushing opening 162 defined between the roller support beam 138 and the adjacent clamping member 172, the bushings 130 may, instead, be configured to be received within bushing openings defined entirely by the roller support beam 138. For example, similar to the embodiment shown in FIG. 7, bushing openings may be defined through the roller support beam 138 at a location adjacent to its bottom side 181 for receiving the bushings 140. In such an embodiment, each bushing 140 may be configured to be pressed or otherwise inserted into its corresponding bushing opening defined in the roller support beam 138.

As indicated above, the system 124 may also include various components for coupling the roller support beam 128 to the undercarriage support beam 132. For example, as shown in FIG. 9, the system 124 may include front and rear bushing mounts 187, 188 configured to be coupled between the roller support beam 138 and the undercarriage support beam 132. In several embodiments, each of the bushing mounts 187, 188 may include a frame 189 formed from a rigid material (e.g., steel) suitable for mounting the bushing mount 187, 118 to the undercarriage support beam 132. For example, as shown in the illustrated embodiment, the frame 189 of each bushing mount 187, 188 may be configured to be coupled to the undercarriage support beam 132 via suitable fasteners 190 (e.g., bolts). Additionally, the frame 189 of each bushing mount 187, 188 may be configured to define a frame opening (not shown) for receiving a suitable bushing 192 formed from rubber or any other suitable resilient material. The bushing 192 may, in turn, define a pin opening 193 for receiving one or more pins 194 configured to couple each bushing mount 187, 188 to the corresponding clevis 182, 183 of the roller support beam 138. For instance, the front bushing mount 187 may be positioned between the first and second arms 184, 185 of the front clevis 182 such that the pin opening 193 defined in the associated bushing 192 is aligned with the openings 186 defined in the front clevis arms 184, 185. One or more pins 194 may then be inserted through the aligned openings 186, 193 to couple the front bushing mount 187 to the front clevis 187. Similarly, the rear bushing mount 188 may be positioned between the first and second arms 184, 185 of the rear clevis 183 such that the pin opening 193 defined in the associated bushing 192 is aligned with the openings 186 defined in the rear clevis arms 184, 185. One or more pins 194 may then be inserted through the aligned openings 186, 193 to couple the rear bushing mount 188 to the rear clevis 183.

It should be appreciated that, by coupling the undercarriage support beam 132 to the roller support beam 138 via the bushing mounts 187, 188, the resilient bushings 192 contained within the bushing mounts 187, 118 may provide additional damping to the disclosed suspension system 124. For example, the bushings 192 may compress or deform during operation of the work vehicle 10, thereby allowing relative movement between the roller support beam 138 and the undercarriage support beam 132. Additionally, as shown in FIG. 8, similar to the bushings 40, 140 described above, the resilient bushing 192 included within each bushing mount 187, 188 may include one or more cutouts or secondary openings 195 in addition to its pin opening 193 to allow the compressibility of each bushing 192 to be tailored or adjusted, as desired.

Moreover, as shown in FIG. 9, the system 124 may also include one or more vertical mounts 177 configured to be positioned between the undercarriage support beam 132 and the roller support beam 138. In several embodiments, each vertical mount 177 may include a lower pad 196, an upper pad 197, and a resilient pad 198 configured to be positioned between the upper and lower pads 196, 197. In one embodiment, each lower pad 196 may be configured to be received within or otherwise positioned adjacent to a corresponding pad notch 199 defined along the top side 180 of the roller support beam 138. Similarly, in one embodiment, each upper pad 197 may be configured to be received within or otherwise positioned adjacent to a corresponding pad notch (not shown) defined along a bottom side 166 of the undercarriage support beam 132. Additionally, the resilient pad 198 may be formed from a suitable resilient material and may be positioned between the upper and lower pads 197, 187 to provide vertical damping between the roller support beam 138 and the undercarriage support beam 132.

It should be appreciated that the undercarriage support beam 132 shown in FIG. 9 may generally be configured the same as or similar to the undercarriage support beam 32 described above with reference to FIGS. 2-7. For instance, the undercarriage support beam 132 may extend lengthwise between a forward end 133 and an aft end 135, with each end 133, 135 including suitable features for coupling the idler wheel assemblies 26, 28 to the support beam 132. Additionally, the undercarriage support beam 132 may define outboard and inboard openings 34, 36 for receiving suitable pivot pins for coupling the support beam 132 to the vehicle's chassis 16. However, as shown in FIG. 9, when the roller wheel assemblies 30 are configured to be coupled to the roller support beam 138, the bottom side 166 of the undercarriage support beam 132 need not include mounting features for coupling the roller shafts 46 to the support beam 132 (e.g., the mounting flanges 64 and beam channels 68 described above with reference to FIGS. 3-7). Rather, as indicated above, the bottom side 166 of the undercarriage support beam 132 may, for example, define suitable notches configured to interface with the upper pads 197 of the vertical mounts 177 positioned between the undercarriage support beam 132 and the roller support beam 138.

It should also be appreciated that a suitable configuration for coupling a roller support beam to an undercarriage support beam using bushing mounts and/or vertical mounts is also described in U.S. Patent Publication No. 2015/0321711, entitled "Pin Assembly for a Tracked Work Vehicle Suspension System," and U.S. Patent Publication No. 2015/0217816, entitled "Suspension System for a Tracked Work Vehicle," the disclosures of both of which are hereby incorporated by reference herein in their entirety for all purposes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A roller suspension system for a track-driven work vehicle, the system comprising:
    a support beam comprising a beam channel defined in a bottom side of the support beam; a resilient bushing configured to be coupled to the support beam such that an upper portion of the resilient bushing is positioned within the beam channel, the resilient bushing defining a shaft opening; and
    a roller wheel assembly, the roller wheel assembly including a roller wheel and a roller shaft, the roller wheel being coupled to and rotatable relative to the roller shaft, wherein the roller shaft is received within the shaft opening of the resilient bushing,
    the system further comprising a clamping member defining a clamp channel, the clamping member configured to be coupled to the support beam such that a bushing opening is defined between the beam channel and the clamp channel, the resilient bushing configured to be received within the bushing opening between the support beam and the clamping member, wherein a surface that defines the bushing opening and extends from the beam channel to the clamp channel is linear.

2. The system of claim 1, wherein the resilient bushing defines at least one secondary opening spaced apart radially from the shaft opening.

3. The system of claim 1, wherein the support beam corresponds to an undercarriage support beam, the undercarriage support beam configured to be pivotally coupled to a chassis of the track-driven work vehicle.

4. The system of claim 1, wherein the support beam corresponds to a roller support beam, the roller support beam configured to be coupled to a separate undercarriage support beam of the track-driven work vehicle.

5. The system of claim 3, further comprising at least one bushing mount configured to be coupled between the roller support beam and the undercarriage support beam.

6. The system of claim 3, further comprising at least one vertical mount configured to be positioned between the roller support beam and the undercarriage support beam.

7. The system of claim 1, wherein the resilient bushing is formed from a rubber material.

8. The system of claim 1, wherein the resilient bushing is configured to compress during operation of the track-driven work vehicle to allow the roller shaft to move relative to the support beam.

9. The system of claim 1, wherein the resilient bushing defines at least one secondary opening spaced apart radially from the shaft opening and intersected by a major axis of a cross section of the bushing.

10. A track assembly for a track-driven work vehicle, the track assembly comprising:
    a track; a drive wheel configured to engage the track; a roller wheel assembly including a roller wheel and a roller shaft coupled to the roller wheel, the roller wheel configured to rotate relative to the roller shaft when the track is being driven by the drive wheel; and a suspension system coupled to the roller wheel assembly, the suspension system comprising:
    a support beam that defines a beam channel in a bottom side of the support beam;
    a resilient bushing configured to be coupled to the support beam such that an upper portion of the resilient bushing is positioned within the beam channel, the resilient bushing defining a shaft opening;
    wherein the roller shaft is received within the shaft opening of the resilient bushing wherein the track assembly further comprises a clamping member defining a clamp channel, the clamping member configured to be coupled to the support beam such that a bushing opening is defined between the beam channel and the clamp channel, the resilient bushing configured to be received within the bushing opening between the support beam and the clamping member, wherein a surface that defines the bushing opening and extends from the beam channel to the clamp channel is linear.

11. The track assembly of claim 10, wherein the support beam corresponds to an undercarriage support beam, the undercarriage support beam configured to be pivotally coupled to a chassis of the track-driven work vehicle.

12. The track assembly of claim 10, wherein the support beam corresponds to a roller support beam, the roller support beam configured to be coupled to a separate undercarriage support beam of the track-driven work vehicle.

13. The track assembly of claim 10, wherein the resilient bushing is configured to compress during operation of the track-driven work vehicle to allow the roller shaft to move relative to the support beam.

14. The track assembly of claim 10, wherein the resilient bushing defines at least one secondary opening spaced apart radially from the shaft opening and intersected by a major axis of a cross section of the bushing.

* * * * *